(12) United States Patent
Argentino

(10) Patent No.: US 11,828,275 B2
(45) Date of Patent: Nov. 28, 2023

(54) AUTOMATIC DOUBLE-ACTING VALVE AND PUMP EQUIPPED WITH SAID VALVE

(71) Applicant: ANNOVI REVERBERI S.P.A., Modena (IT)

(72) Inventor: Pierluigi Argentino, Castelfranco Emilia (IT)

(73) Assignee: ANNOVI REVERBERI S.P.A., Modena (IT)

( * ) Notice: Subject to any disclaimer, the term of this patent is extended or adjusted under 35 U.S.C. 154(b) by 401 days.

(21) Appl. No.: 17/030,601

(22) Filed: Sep. 24, 2020

(65) Prior Publication Data
US 2021/0131420 A1 May 6, 2021

(30) Foreign Application Priority Data

Oct. 30, 2019 (IT) .................. 102019000020050

(51) Int. Cl.
| | |
|---|---|
| *F04B 1/18* | (2020.01) |
| *F04B 7/02* | (2006.01) |
| *F04B 53/10* | (2006.01) |
| *F16K 11/10* | (2006.01) |

(52) U.S. Cl.
CPC .............. *F04B 1/18* (2013.01); *F04B 7/0208* (2013.01); *F04B 53/108* (2013.01); *F04B 53/109* (2013.01); *F16K 11/10* (2013.01)

(58) Field of Classification Search
CPC ........ F04B 1/12; F04B 1/14; F04B 1/18–188; F04B 7/0208; F04B 53/109; F04B 53/108; F04B 53/103; F04B 53/1032; F16K 11/10; F16K 27/0209; F16K 27/0263; F16K 11/105

USPC ............................................. 137/511–543.23
See application file for complete search history.

(56) References Cited

U.S. PATENT DOCUMENTS

| | | | | |
|---|---|---|---|---|
| 3,811,801 A | * | 5/1974 | Buse ...................... | F04B 49/243 |
| | | | | 417/454 |
| 4,239,463 A | * | 12/1980 | Yaindl ................... | F04B 53/007 |
| | | | | 417/454 |
| 4,412,792 A | * | 11/1983 | LaBorde ............... | F04B 53/109 |
| | | | | 137/454.6 |

(Continued)

FOREIGN PATENT DOCUMENTS

| | | |
|---|---|---|
| DE | 1911534 A1 | 9/1970 |
| DE | 3003869 A1 * | 8/1981 |
| EP | 1378662 A1 | 1/2004 |

*Primary Examiner* — Alexander B Comley
(74) *Attorney, Agent, or Firm* — Volpe Koenig

(57) ABSTRACT

An automatic double-acting valve includes: a valve body, a central duct, passing through the valve body and is equipped with a first opening made in a first end of the valve body and a second opening made in an opposite second end, a peripheral duct made in the valve body, eccentric to the central duct and equipped with a first opening, in a side surface between the first end and the second end, and a second opening in the second end of the valve body, a first blocking body movable at least between a closed position, in which it obstructs the first opening of the central duct, and an open position, a first elastic element configured to generate a force adapted to keep the first blocking body closed, a second blocking body movable at least between a closed position, in which it obstructs the second opening, and an open position.

8 Claims, 6 Drawing Sheets

(56) References Cited

U.S. PATENT DOCUMENTS

| | | | | |
|---|---|---|---|---|
| 4,551,077 A * | 11/1985 | Pacht | ............... | F04B 53/109 |
| | | | | 417/454 |
| 4,792,287 A * | 12/1988 | Alaze | ............... | F04B 1/18 |
| | | | | 417/515 |
| 4,862,911 A * | 9/1989 | Yie | ............... | F04B 53/109 |
| | | | | 417/571 |
| 5,037,276 A * | 8/1991 | Tremoulet, Jr. | ............... | F04B 53/103 |
| | | | | 417/470 |
| 5,636,975 A * | 6/1997 | Tiffany | ............... | F04B 53/109 |
| | | | | 417/454 |
| 2005/0126638 A1* | 6/2005 | Gilbert | ............... | F16K 15/044 |
| | | | | 137/539 |
| 2012/0251366 A1* | 10/2012 | Kuroyanagi | ............... | F04B 53/1087 |
| | | | | 417/440 |
| 2014/0166138 A1* | 6/2014 | Bisig | ............... | F16K 27/0209 |
| | | | | 29/890.12 |
| 2018/0200750 A1* | 7/2018 | Ramina | ............... | F16K 27/0245 |

* cited by examiner

AUTOMATIC DOUBLE-ACTING VALVE AND PUMP EQUIPPED WITH SAID VALVE

TECHNICAL FIELD

The present invention relates to a valve, in particular an automatic double-acting delivery and suction valve for pumps, e.g. high-pressure pumps, and a pump equipped with said valve, preferably an axial piston pump.

BACKGROUND

Automatic double-acting valves are known which, if connected to the pumping chamber of a pump, to a delivery duct and to a suction duct automatically allow, on the basis of pressure differences, the suction of the liquid to be pumped through the suction duct towards the pumping chamber and the sending of fluid pumped from the pumping chamber to the delivery duct.

A known embodiment of said automatic double-acting valves comprises a valve body in which a central duct is made which crosses it from one side to the other defining a first opening at a first axial end and a second opening at a second axial end of the valve body. Such central duct is configured to place in fluid communication the pumping chamber with the delivery duct.

The valve then comprises a peripheral duct, eccentric with respect to the central duct and equipped with a first opening, made in a side surface of the valve body, and a second opening made in the second end of the valve body. The peripheral duct is configured to place the suction duct in fluid communication with the pumping chamber.

The valve also comprises a first blocking body, for hermetically closing the first opening of the central duct under the thrust of a first elastic element, and a second blocking body for hermetically closing the second opening of the peripheral duct under the thrust of a second elastic element.

In particular, the valve is conformed so that when the volume of the pumping chamber increases, a depression is generated therein which overcomes the force of the second elastic element releasing the second opening of the peripheral duct from the second blocking body. When the volume of the pumping chamber is reduced, an over-pressure is generated in the pumping chamber it-self which overcomes the force of the first elastic element, releasing the first opening of the central duct from the first blocking body.

The valve body must be made of brass or steel in order to withstand the mechanical strain due to the continuous opening and closing of the blocking bodies, which complicates the mechanical processing to be performed on the valve body and thus implies relatively high costs also from the point of view of the cost of the actual material used.

The aim of the present invention is that of overcoming the constraints of the prior art within the context of a simple and rational construction solution.

Such object is achieved by the features of the invention indicated in the independent claim. The dependent claims outline preferred and/or particularly advantageous aspects of the invention.

SUMMARY

The invention particularly provides an automatic double-acting valve for high pressure pumps comprising:
a valve body,
a central duct of the pass-through type, which passes through the valve body and is equipped with a first opening made in a first end of the valve body and a second opening made in an opposite second end of the valve body,
a peripheral duct made in the valve body, eccentric with respect to the central duct and equipped with a first opening, made in a side surface of the valve body comprised between the first end and the second end, and a second opening made in the second end of the valve body,
a first blocking body movable at least between a closed position, in which it hermetically obstructs the first opening of the central duct, and an open position, in which it is spaced from the first opening of the central duct and allows the passage of flow through the first opening itself,
a first elastic element configured to generate a force adapted to keep the first blocking body in the closed position,
a second blocking body movable at least between a closed position, in which it hermetically obstructs the second opening of the peripheral duct, and an open position, in which it is spaced from the second opening of the peripheral duct and allows the passage of flow through the second opening itself, and
a second elastic element configured to generate a force adapted to keep the second blocking body in the closed position,
wherein the valve body comprises a first portion equipped with the first opening of the central duct, a second portion equipped with the second opening of the central duct, and a third portion interposed between the first portion and the sec-ond portion and which is made of a material having a surface hardness lower than the material with which the first portion and the second portion are made.

Thanks to such solution, the construction of the valve implies simpler processes, e.g. because the first peripheral duct is made of a material having a lower sur-face hardness, and further enables a more efficient and rational use of the material that must withstand the wear that comes from contact with the blocking body. Furthermore, the material used for the third portion can have a lower density and therefore the valve may be lighter.

For example, the first portion and the second portion may be made of a material having a surface hardness of at least 160 Hb.

According to an aspect of the invention, the first portion and the second portion may be made of a metallic material selected from the group of metallic materials comprising stainless steels and brass alloys.

Such group of materials guarantees good workability and at the same time sufficient hardness.

According to another aspect of the invention, the third portion may be made of a material having a compressive strength higher than 60 MPa.

For example, the third portion is made of a material selected from the following group of materials comprising aluminum alloys and plastic materials.

In this way the valve is particularly light, but at the same time resistant.

An aspect of the invention envisages that the first portion can comprise a shank dimensioned in such a way as to be inserted by interference in a respective accommodation seat made in the third portion.

Thanks to such a solution, the assembly does not require any additional connection members such as for example threads or welding.

Another aspect of the invention envisages that the valve can comprise a retaining body fixed to the valve body and configured to retain in position one from be-tween the first elastic element and the second elastic element in such a way that the elastic element exerts on the respective blocking body the force adapted to maintain it in the closed position.

Thanks to such solution it is not necessary to perform any processes for creating shoulders adapted to keep the elastic element in position with respect to the valve body in the heads of the pumps in which the valve is to be housed, which enables the planning and production times and the costs to be reduced. Furthermore, the fact that the retaining body is fixed with respect to the valve body simplifies and speeds up the pump assembly operations.

According to an aspect of the invention, the retaining body can be fixed to the valve body in a removable way.

This characteristic enables the valve maintenance operations to be simplified, e.g. to enable the replacement of the elastic elements.

For example, the retaining body can be fixed to the valve body through a snap-fit mechanism.

In this way the assembly and disassembly of the valve can be particularly practical and quick, and do not require the use of tools.

According to another aspect of the invention, the retaining body can be config-ured to retain the second elastic element in position.

Generally, as described in this document, the second end is the one turned to-wards the pumping chamber and in this way no shoulders are necessary in the cylinder or in the cylinder jacket, if a jacket is envisaged, to keep the retaining body still.

According to a further aspect of the invention, the valve can comprise two retaining bodies, one of which is a first retaining body fixed to the valve body and con-figured to retain the first elastic element in position and a second retaining body fixed to the valve body and configured to retain the second elastic body in position.

Another aspect of the invention envisages that the second retaining body may comprise a cup-shaped portion equipped with a through hole at least partially aligned with the central hole of the valve body and a through opening, eccentric with respect to the through hole and adapted to be closed by the second blocking body when a flow at the outlet from the peripheral duct overcomes the force of the second elastic element.

In this way, when the pressure increases in the pumping chamber of the pump in which the valve is installed, quicker closing of the second blocking body is guaranteed. Furthermore, such characteristic enables quicker opening of the second blocking body as it enables the fluid present inside the retaining body to be expelled more quickly. Such advantages are with respect to when there is on-ly a through hole in the retaining body.

The invention further provides an axial piston pump for the pumping of a liquid comprising:
a base,
a cylinder head fixed to said base,
a plurality of cylinders having central axes parallel to each other and formed in the head,
a plurality of pistons that each slide within a respective cylinder of the plurality of cylinders for the pumping of the liquid,
an inclined plate configured to operate the sliding of said pistons inside the respective cylinders, and
an automatic double-acting valve, according to any one of the preceding claims, for each cylinder.

Thanks to this solution, a pump is provided whose design is quicker with respect to devices of the prior art and which is also quicker to assemble.

According to an aspect of the invention, each cylinder may be made in the head as a blind hole, and each valve can be housed in a bottom portion of the respective cylinder, which bottom portion is shaped so that the valve is oriented with a central axis of the central duct parallel to a central axis of the cylinder and occludes said bottom portion.

Thanks to such solution, the head is more resistant to fatiguing loads due to pressure pulsations and can therefore be made of materials having lower resistance to fatiguing loads such as, for example, aluminum with respect to those currently used which are stainless steel and brass. Aluminum has the ad-vantage of being easier to process and lighter with respect to stainless steel and brass alloys. There is an advantage in particular because such configuration enables the number of holes crossing the head to be reduced for inserting the valves with respect to pumps of the prior art, and therefore the geometries of the head that cause notching effects to be reduced which are, in turn, the cause of the reduction of the head's resistance to fatigue. In particular, in known axial piston pumps equipped with plates, an auto-matic one-direction suction valve and an automatic one-direction delivery valve are used for each cylinder, and for the installation of at least one of the two a hole must be made in a face of the head opposite the base. The configuration of the pump according to the invention makes it possible not to have to make such holes in such positions, thus improving the fatigue resistance of the head.

Furthermore, the valve substantially acts as a screen for the bottom wall against the fatiguing pressure changes that take place in the pumping chamber.

Furthermore, such configuration enables all the pump connection components for the suction and the delivery to be made on one side only.

Contributing to the perfection of such improvements in terms of resistance to fatiguing forces there is another aspect of the invention according to which each cylinder comprises a jacket inserted into the cylinder itself and inside which the respective piston slides, which jacket extends from the automatic double-acting valve to at least a first annular sealing gasket that embraces the piston.

In this way it is possible to further reduce the fatiguing strain to which the head is subject as the valve and the jacket substantially isolate the head from such pulsations.

According to another aspect of the invention, the head is made of die cast aluminum.

In this way it is light and easy to process.

BRIEF DESCRIPTION OF THE DRAWINGS

Further features and advantages of the invention will be more apparent after reading the following description pro-vided by way of non-limiting example, with the aid of the accompanying drawings.

DETAILED DESCRIPTION OF THE PREFERRED EMBODIMENTS

Figure 1:
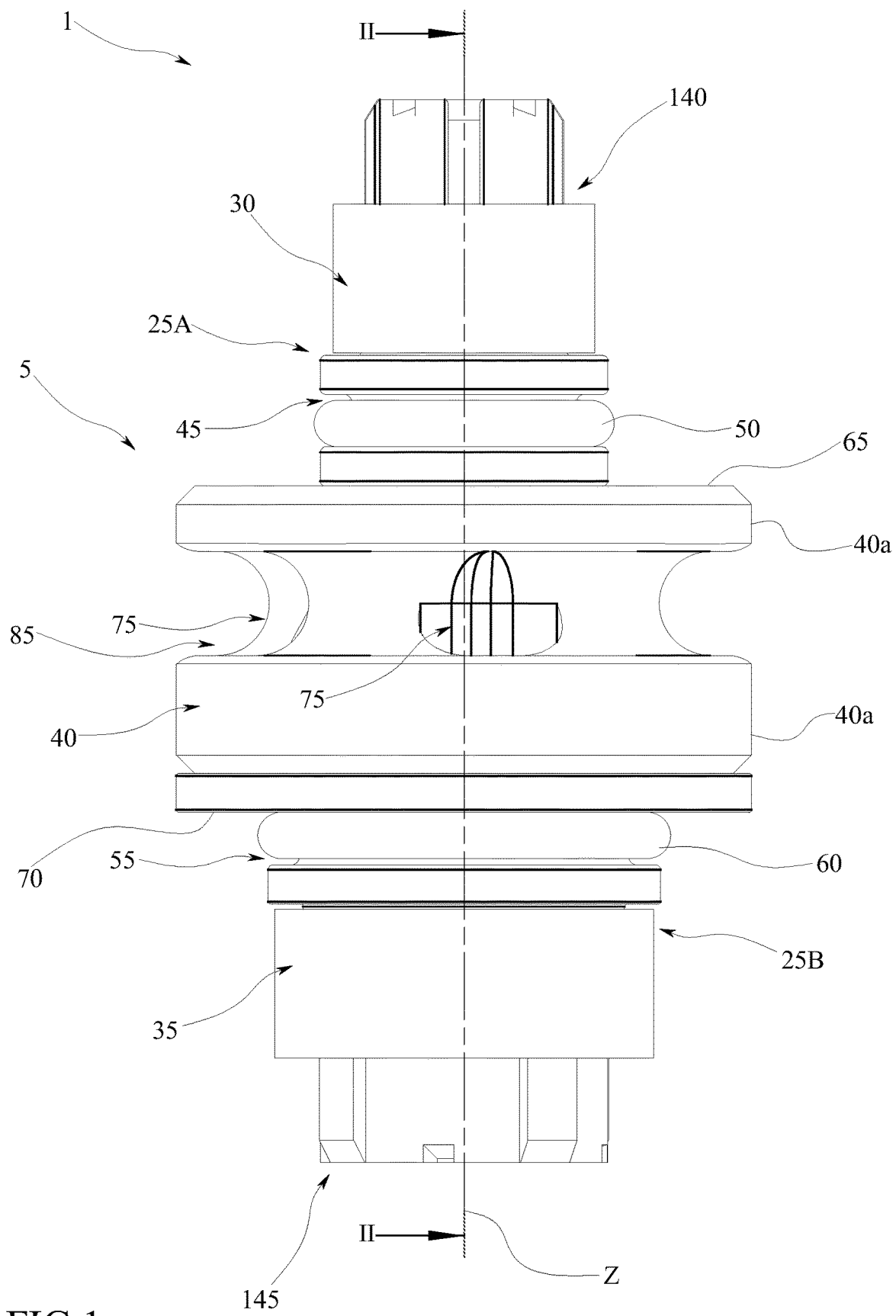
FIG. 1 is a front view of an automatic double-acting valve according to the invention.
Figure 2:
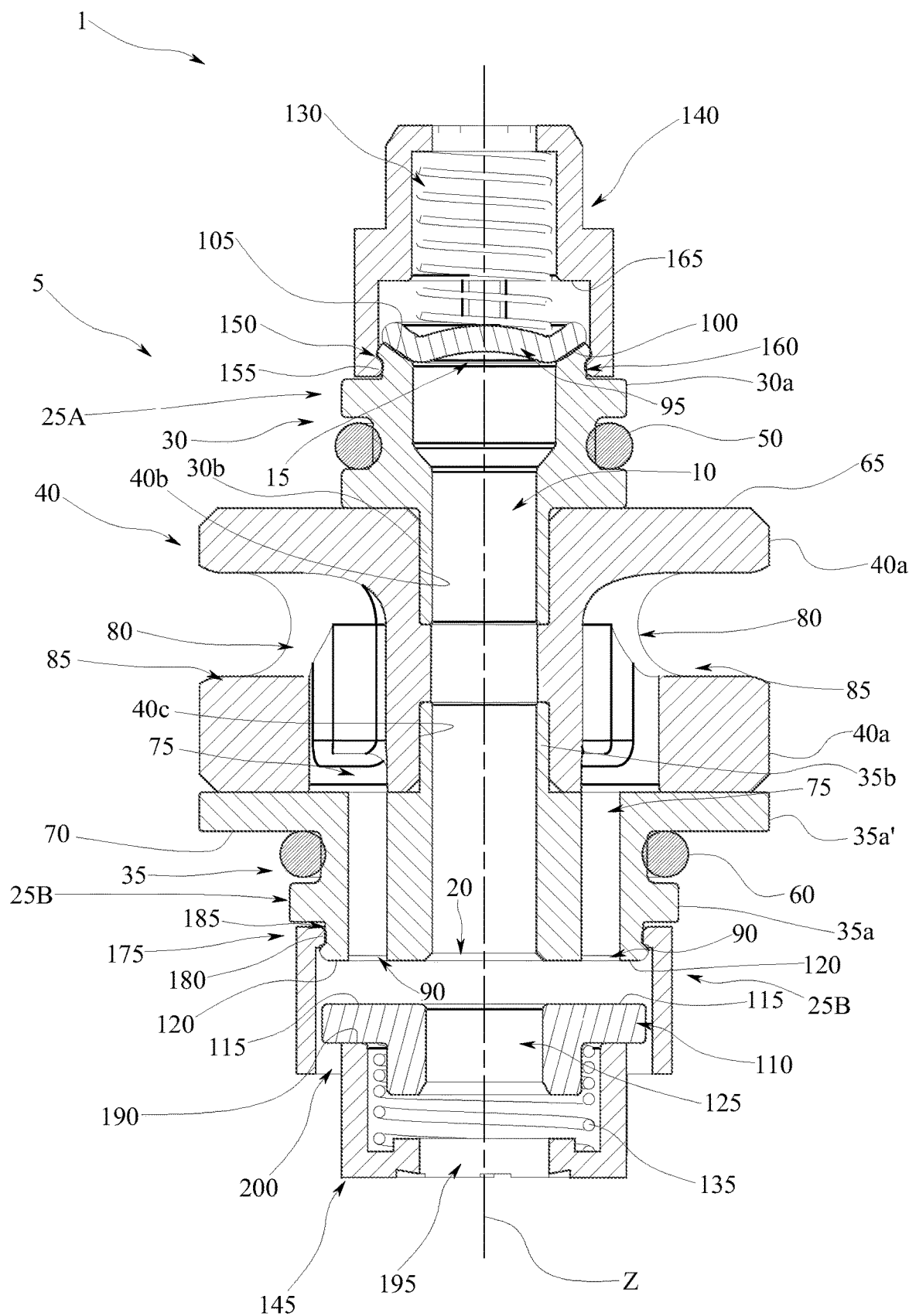
FIG. 2 is a sectional view according to the plane II-II of the valve in FIG. 1 illustrated in a suction step.
Figure 3:
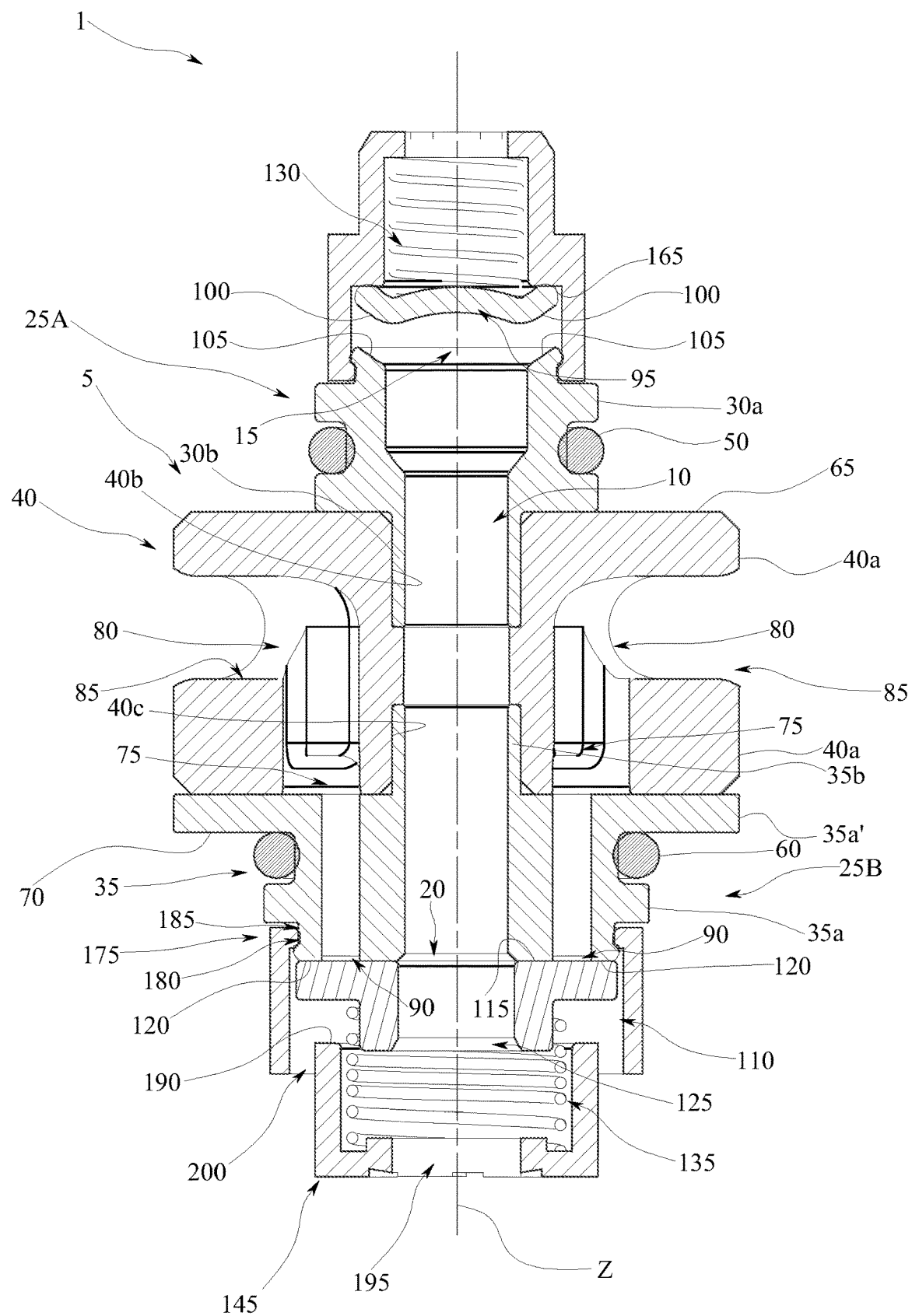
FIG. 3 is a sectional view according to the plane II-II of the valve in FIG. 1 illustrated in a delivery step.

With particular reference to FIGS. 1 to 3, 1 indicates overall an automatic double-acting valve, abbreviated below as valve 1.

It is specified that an automatic valve means a valve configured to open automatically, enabling fluid communication between two or more environments, be-tween which it is interposed, upon reaching a predefined difference between the pressure present in the environments divided by the valve itself. In even more detail automatic valves do not exploit electromechanical actuation mechanisms, but only pressure differences.

It is also specified that double-acting valve means a valve adapted to be inter-posed between a first environment, a second environment and a third environment and configured to place selectively in communication either only the first environment with the second environment or only the second environment with the third environment. When the valve is installed in a pump the first environment is a suction duct, the second environment is a pumping chamber and the third environment is a delivery duct.

The valve 1 comprises a valve body 5 which is crossed from one side to the other by a central duct 10 equipped with a first opening 15 and an opposite second opening 20 made in the valve body itself. This means that said central duct 10 comprises a first opening 15 made in a first end 25A of the valve body 5 and a second opening 20 made in an opposite second end 25B of the valve body 5. In particular, the central duct 10 comprises only the first opening 15 and the second opening 20.

Such ends are axial ends of the valve body 5 with respect to a central axis Z of the valve body itself, with respect to which the central duct 10 is coaxial. In particular, the valve body 5 is conformed like a revolution body with respect to said central axis Z.

The central duct 10 may be rectilinear, and preferably equipped with an internal cylindrical shaped surface.

In the embodiment illustrated, the valve body 5 comprises a first portion 30, at which the first opening 15 is made, a second portion 35, at which the second opening 20 is made, and a third portion 40, which is interposed, for example directly and in contact, between the first portion and the second portion and is crossed, like the first portion and the second portion, by the central duct 10.

The first end 25A is therefore made available by the first portion 30 and the sec-ond end 25B is made available by the second portion 35.

The first portion 30 comprises a cylindrical side surface 30a coaxial to the central duct 10, i.e. coaxial to the central axis Z.

For example, the first portion comprises a seat 45 shaped like an annular hollow made at the cylindrical side surface of the first portion itself, adapted to house a sealing gasket 50.

The second portion 35 has a first cylindrical side surface 35a and a second cylindrical side surface 35a' coaxial to one another and coaxial to the central duct 10, i.e. to the central axis Z. For example, the second portion 35 comprises a seat 55, shaped like an annular hollow made at the first cylindrical side surface 35a, adapted to house a sealing gasket 60.

The second cylindrical side surface 35a' is proximal to the third portion with respect to the first cylindrical side surface 35a, has a larger average radius with respect to the first cylindrical side surface 35a and is connected thereto by means of a flat surface 70 which is transversal, e.g. perpendicular, to the central axis Z. In particular, such flat surface 70 partially defines the seat 55.

The third portion 40 is cylindrical shaped and has a larger average radius with respect to the first portion and to the first cylindrical side surface 35a, so as to project with respect thereto in the radial direction with respect to the central axis Z. In particular, the third portion has a cylindrical side surface 40a which projects radially with respect to the cylindrical side surface 30a of the first portion and substantially has the same diameter as the second cylindrical side surface 35a'.

The valve body 5 comprises a first abutment surface 65 and an opposite second abutment surface, transversal to the central axis Z. In particular such abutment surfaces 65,70 are flat, e.g. annular, preferably lying on perpendicular planes to the central axis Z.

In the embodiment illustrated, the first abutment surface 65 is made in the third portion 40 of the valve body 5 and the second abutment surface is defined by the flat surface 70 placed radially between the first cylindrical side surface 35a and the second cylindrical side surface 35a'. By way of example, the first abutment surface 65 faces towards the first portion 30, while the second abutment surface faces towards the first cylindrical side surface 35a.

The first abutment surface 65 and the second abutment surface are adapted to enable the correct positioning and locking of the valve body 5 when the latter is inserted into a respective seat made in a pump.

The first portion and the second portion are made of a material having a greater surface hardness with respect to the material of which the third portion is made. For example, the first portion and the second portion are made of a material having a surface hardness of at least 160 Hb.

Furthermore, the first portion and the second portion are made of a material having a fatigue limit at least equal to 60 MPa.

The first portion and the second portion may for example be made of a material selected from the following group of materials among stainless steel, brass alloys and aluminum alloys. In the case of aluminum, the latter must be subsequently subjected to a surface hardening process. Preferably the first portion and the second portion are made of the same material.

The third portion is made of a material having greater compressive strength than 60 MPa and preferably also having a density less than 8.7 kg/dm^3.

For example, the third portion may be made of an aluminum alloy or a plastic material.

The first portion 30 and the second portion 35 and the third portion 40 are each made in a respective body distinct from the other two and are rigidly fixed together, e.g. mechanically.

In particular, the first portion 30 and the second portion 35 are rigidly fixed to the third body 40 by means of interference. In particular, the first portion and the second portion respectively comprise a shank 30b and 35b, which are inserted by interference in a respective seat 40b,40c made in the third portion 40.

In the embodiment illustrated in the figures, the shanks 30b and 35b are shaped like cylindrical tubular bodies coaxial to the central axis Z, e.g. each defining a respective portion of the central duct 10. This means that each shank has a cylindrical side surface that defines said respective portion of the central duct.

The seats 40b and 40c are each equipped with a cylindrical surface coaxial to the central axis Z having a smaller diameter with respect to an outer diameter of the cylindrical tubular body of the respective shank. For example, the seats are equipped with a shoulder, adapted to be contacted by a respective shank 30b,35b and lying on a transversal axis to the central axis Z.

Between the seats 40b and 40c a cylindrical surface is interposed which defines a portion of the central duct interposed between the portions of the central duct 10 defined by the shanks.

Such cylindrical surface has a diameter equal to the inner diameter of the cylindrical tubular bodies with which the shanks 30b,35b are equipped.

The valve 1 comprises a peripheral duct 75 made in the valve body, e.g. in the second portion 35 and in the third portion 40, eccentric and distinct with respect to the central duct 10.

Said peripheral duct 75 comprises a first opening 80 made in a side surface of the valve body 5 comprised between the first end 25A and the second end 25B, e.g. made in the third portion 40, i.e. made in the cylindrical side surface 40a of the third portion 40. In detail, the first opening 80 leads into an annular groove 85 made in the third portion and open onto the cylindrical side surface 40a of the third portion itself.

The peripheral duct 75 also comprises a second opening 90, in particular the peripheral duct only comprises said first opening 80 and said second opening 90.

The second opening 90 is made in the second end of the valve body 5, e.g. therefore in the second portion 35, and is distinct from the second opening 20 of the central duct 10. Preferably, the second opening 90 is arranged with its central axis parallel to the central axis Z, in particular also perpendicular to a central axis of the first opening 80.

For example, the second opening 20 of the central duct 10 and the second opening 90 of the peripheral duct 75 lie on the same plane, e.g. perpendicular to the central axis Z. This means that the second end of the valve body, i.e. the second portion 35, comprises a flat surface, e.g. perpendicular to the central axis Z, in which the second opening 90 of the peripheral duct 75 is made.

The peripheral duct preferably has a cross section, with respect to a longitudinal axis thereof, that is substantially circular shaped.

For example, the peripheral duct 75 comprises at least one rectilinear portion that ends in the second opening 90 and that has a longitudinal axis parallel to the central axis Z.

In particular, the peripheral duct comprises a first, rectilinear, portion, substantial-ly shaped like a through hole with a circular section, made entirely in the second portion 35 and that comprises the second opening 90. Furthermore, the peripheral duct 75 comprises a second, curved, portion, entirely made in the third portion 40, which comprises the first opening 80 and which is directly communicating with the first portion. For example, the second portion of the peripheral duct is substantially L-shaped.

In the embodiment illustrated, the valve comprises a plurality of peripheral ducts 75, each conformed as described above, circumferentially arranged with respect to the central duct 10, i.e. to the central axis Z.

The valve 1 comprises a first blocking body 95, which is movable at least be-tween a closed position, in which it hermetically obstructs the first opening 15 of the central duct 10, and an open position, in which it is spaced from the first opening 15 of the central duct and allows the passage of flow through the first opening itself.

In particular, the first blocking body comprises a contact surface 100 which, when the first blocking body is in the closed position, is in contact, at least along a closed perimeter, with a seat 105 of the first blocking body itself made in the valve 5 at the first opening 15. In the embodiment illustrated, the first blocking body 95 is equipped with a truncated conical contact surface 100 and the seat 105 is equipped with a conjugated truncated conical contact surface.

The valve 1 also comprises a second blocking body 110, which is movable at least between a closed position, in which it hermetically obstructs the second opening 90 of the peripheral duct 75, and an open position, in which it is spaced from the second opening 90 of the peripheral duct 75 and allows the passage of flow through the second opening itself.

In particular, the second blocking body 110 comprises a contact surface 115 which, when the second blocking body is in the closed position, is in contact, at least along a closed perimeter, with a seat 120 of the second blocking body itself made in the valve 5 at the second opening 90. For example, the contact surface 115 is flat and the seat 120 is equipped with a conjugated flat contact surface. In particular, in the embodiment illustrated, the flat contact surface of the second blocking body is annular and is shaped so as to come into contact with a flat sur-face onto which the second openings 90 of the plurality of peripheral ducts 75 lead.

Said second blocking body 110 comprises a through hole 125 which is always in direct fluid communication with the central duct through the second opening 20. In particular, the through hole 125 crosses the contact surface 115 of the second blocking body itself.

For example, such through hole 125 is coaxial with the central axis Z and internal with respect to the flat contact surface 115 of the second blocking body 110.

Furthermore, such through hole 125 can have a greater diameter with respect to a diameter of the second opening 20 of the central duct 10.

The valve 1 comprises a first elastic element 130 configured to generate a force adapted to keep the first blocking body 95 in the closed position and a second elastic element 135 configured to generate a force adapted to keep the second blocking body 110 in the closed position. Such elastic elements are preferably springs, e.g. helical compression springs.

Furthermore, the valve 1 comprises a retaining body 140,145 fixed, for example rigidly, i.e. without any residual degrees of freedom, to the valve body 5 and con-figured to retain in position one from among the first elastic element and the second elastic element with respect to the valve body 5, so that said elastic element generates said force adapted to keep the respective blocking body in the closed position.

In particular, the retaining body 140,145 is fixed in a removable way to the valve body 4, i.e. the retaining body 140,145 is fixed to the valve body through a connecting member that enables both the fixing of the retaining body 140,145 to the valve body, and the removal of the retaining body 140,145 from the valve body.

In particular, the retaining body 140,145 is fixed to the valve body by means of a snap-fit mechanism, i.e. said connection member comprises a snap-fit mechanism.

Such snap-fit mechanism is of the type in which at least one from among the valve body and the retaining body 140,145 is elastically deformed against the other during a mutual approaching movement of said bodies, so that during said approaching movement a protuberance of one body slides on a contact surface of the other body until it is inserted into a cavity of said other body, where it is then maintained thanks to the elastic deformation generated during the relative sliding. The cavity is shaped so as to prevent, by obstacle, a movement of the retaining body 140,145 along a parallel direction to the central axis Z. For example, it is the retaining body 140,145 that is elastically deformed with respect to the valve body.

In particular, the retaining body 140,145 may comprise at least one end portion equipped with a protuberance and a wall that is deformable by bending, from which the protuberance projects towards the center of the retaining body 140,145 itself, and the valve body comprises a cavity, e.g. an annular groove, adapted to house the retaining body 140,145 and shaped so as to prevent, by obstacle, a movement of the retaining body 140,145 along a parallel direction to the central axis Z.

The retaining body 140,145 has a portion shaped like a cup inside which the respective blocking body is contained.

For example, the retaining body 140,145 comprises an abutment surface for the blocking body, spaced from the valve body 5, preferably perpendicular to the central axis Z, which defines a stroke end for the distancing of the blocking body from the valve body. In particular, it defines a maximum opening position of the blocking body itself, in which the distance of the blocking body from the respective opening which is configured to close is maximum.

The contact abutment surface is in contact with a surface of the respective blocking body which is opposite the contact surface of the corresponding blocking body.

It is not excluded that in an alternative embodiment the retaining body 140,145 is fixed to the valve body through other removable connection means such as for example threaded connection members or threaded portions obtained on the retaining body 140,145 and on the valve body themselves.

Furthermore, the retaining body comprises a surface adapted to act as a guide for the respective blocking body.

In the embodiment illustrated, the valve comprises a first retaining body 140 and a second retaining body 145.

The first retaining body 140 is fixed, for example rigidly, i.e. without any residual degrees of freedom, to the valve body 5, in particular to the first portion 30, and is configured to retain in position the first elastic element 130 with respect to the valve body 5, so that the first elastic element 130 generates the force adapted to keep the first blocking body 95 in the closed position.

The first retaining body 140 can be fixed in a removable way to the valve body, i.e. through a connection member that enables both the fixing of the first retaining body 140 to the valve body 5 and the removal of the first retaining body from the valve body 5.

For example, the first retaining body 140 is fixed to the valve body by means of a snap-fit mechanism 150, i.e. said connection member comprises a snap-fit mechanism.

In particular, the first retaining body 140 comprises a cup-shaped portion arranged with concavity turned towards the valve body 5, i.e. towards the first portion 30 of the valve body, and the snap-fit mechanism 150 comprises an end portion that can be deformed by bending obtained at the end of the cup-shaped body facing towards the valve body, which end portion is equipped with a protuberance 155, e.g. annular and concentric to the central duct 10, which projects towards an internal volume of the cup-shaped portion. The snap-fit mechanism of the first retaining body 140 then also comprises a cavity, e.g. an annular groove 160, obtained in the valve body, i.e. in the first portion of the valve body, and adapted to house the protuberance of the first retaining body. Said cavity is shaped so as to make a connection by obstacle with said protuberance.

The first retaining body can comprise an abutment surface 165 for the first blocking body 95, which abutment surface is spaced from the valve body 5, is preferably perpendicular to the central axis Z, and defines a stroke end upon the distancing of the first blocking body 95 from the valve body.

Furthermore, the first retaining body can comprise a through hole 125 made at a bottom wall of the cup-shaped portion opposite the portion of first retaining body in contact with the valve body 5. Such through hole 125 is crossed by the fluid flow that crosses the first opening 15 of the central duct 10.

The second retaining body 145 is fixed, for example rigidly, i.e. without any residual degrees of freedom, to the valve body 5, in particular to the second portion 35, and is configured to retain in position the second elastic element 135 with respect to the valve body 5, so that the second elastic element 135 generates the force adapted to keep the first blocking body 110 in the closed position.

The second retaining body 145 can be fixed in a removable way to the valve body 5, i.e. through a connection member that enables both the fixing of the second retaining body 145 to the valve body 5 and the removal of the second retaining body from the valve body 5.

For example, the second retaining body 145 is fixed to the valve body by means of a snap-fit mechanism 175, i.e. said connection member comprises a snap-fit mechanism.

In particular, the second retaining body 145 comprises a cup-shaped portion arranged with concavity turned towards the valve body 5, i.e. the second portion 35, and the snap-fit mechanism 175 comprises an end portion that can be de-formed by bending obtained at the end of the cup-shaped body facing towards the valve body, which end portion is equipped with a protuberance 180, e.g. annular and concentric to the central duct 10, which projects towards an internal volume of the cup-shaped portion. The snap-fit mechanism of the second retaining body 145 also comprises a cavity, e.g. an annular groove 185 concentric to the central duct 10, obtained in the valve body 5, i.e. in the second portion 35, and adapted to house the protuberance 180 of the second retaining body and shaped so as to form a connection by obstacle with said protuberance.

The second retaining body 145 can comprise an abutment surface 190 for the second blocking body 110, which abutment surface 190 is spaced from the valve body 5, is preferably perpendicular to the central axis Z, and defines a stroke end upon the distancing of the second blocking body 110 from the valve body.

The abutment surface 190 is in contact with a surface of the second blocking body turned in the opposite direction with respect to the contact surface with the seat of the second blocking body itself.

The second retaining body 145 can comprise a through hole 195 made at a bottom wall of the cup-shaped portion opposite the portion of second retaining body in contact with the valve body 5. Such through hole 195 is directly and always in fluid communication with the through hole 125 of the second blocking body, in particular it is also coaxial with the central axis Z. In particular, such through hole 195 is crossed by at least part of the fluid flow that crosses the second opening 20 of the central duct 10.

The second retaining body 145 can also comprise at least one through opening 200 made in the cup-shaped portion and configured so that, when the second blocking body is in contact with the abutment surface 190, i.e. it is in the maxi-mum opening position, the second blocking body 110 only partially occludes the through opening.

From a fluid dynamic point of view the through opening 200 is in parallel with the through opening 195 with respect to the second opening 20 of the central duct 10.

The through opening 200 is eccentric with respect to the through hole 195 and for example also radially more external with respect to the abutment surface 190 of the second blocking body (with respect to the central axis Z). In particular the second blocking body 110 projects radially with respect to the abutment surface 190 of the second retaining body (away from the central axis Z) and the through opening 200 is at least partially aligned with such portion that projects along a parallel direction to the central axis Z.

Thanks to the through opening 200 it is possible to bring the second blocking body 110 more quickly into the closed position when the pressure at the second opening 90 of the peripheral duct is lower than the pressure measured in an external point with respect to the cup-shaped portion of the second retaining body 145.

Preferably the second retaining body 145 comprises a plurality of through openings 200 circumferentially arranged around the through hole 195.

In the embodiments illustrated, the first retaining body and the second retaining body are cup-shaped, i.e. the cup-shaped portion discussed above substantially constitutes the retaining body itself. However, it is not excluded that in an embodiment not illustrated, the retaining body may be shaped like a rod or a folded sheet.

Figure 4:
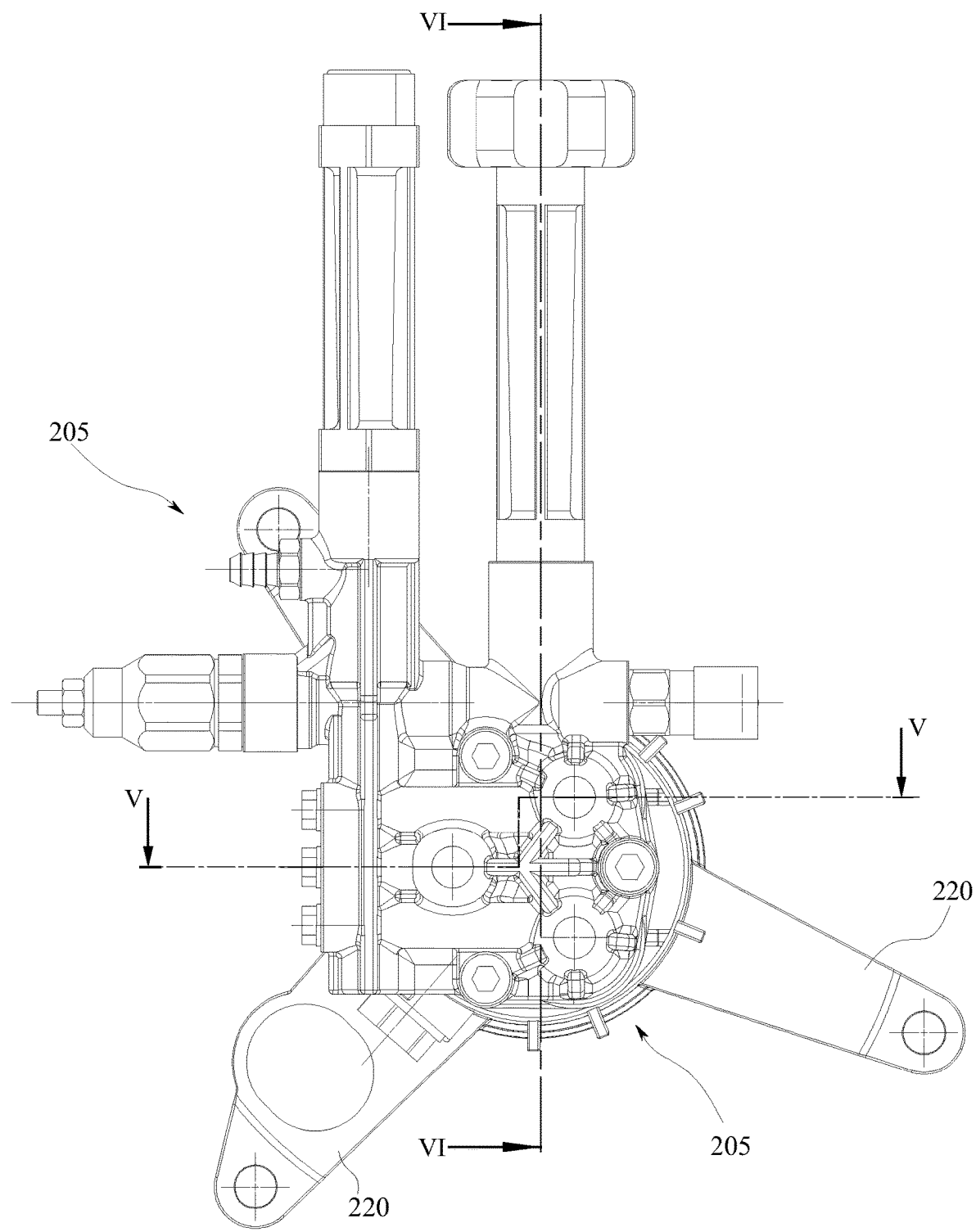
FIG. 4 is a view from above of a pump equipped with the valve according to the invention.
Figure 5:
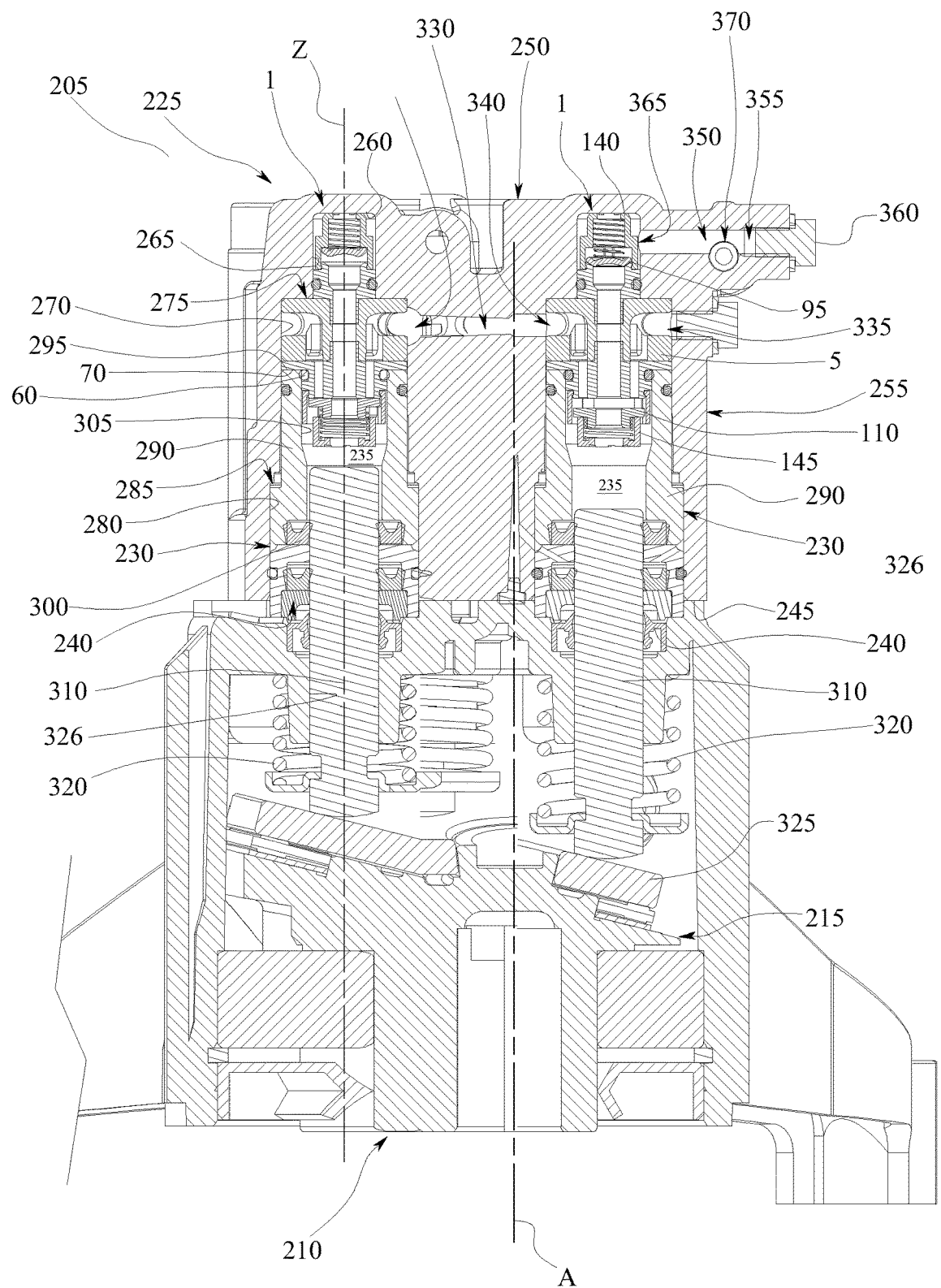
FIG. 5 is a sectional view of the pump of FIG. 4 according to plane V-V.
Figure 6:
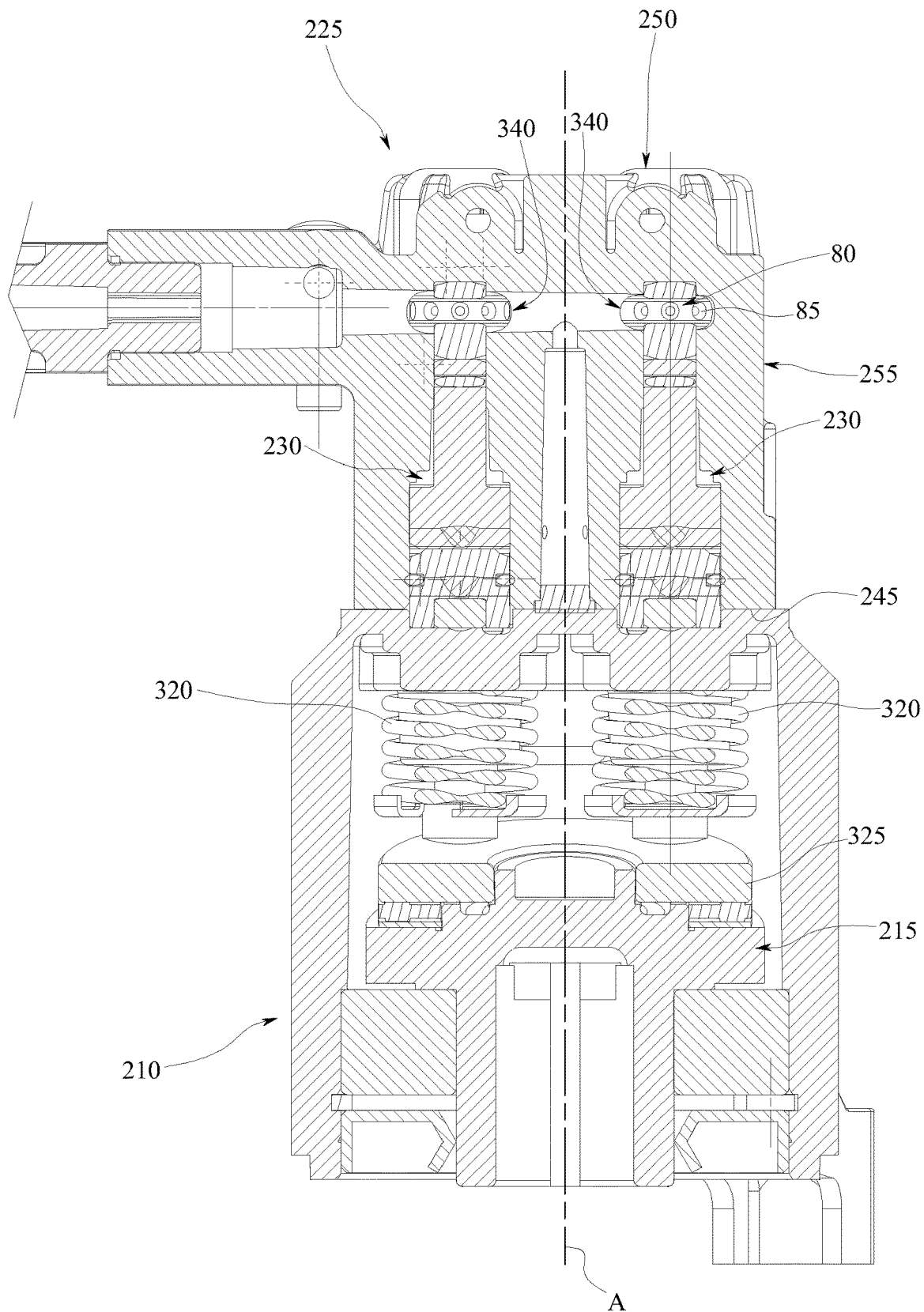
FIG. 6 is a sectional view of the pump of FIG. 4, according to the plane VI-VI.

With particular reference to FIGS. 4 and 5, 205 indicates a high-pressure axial piston pump, equipped with at least one valve 1 for regulating the pumping flow. In particular, it is a high-pressure axial piston pump and of the rotating plate type inclined at a fixed inclination.

The axial piston pump 205 can comprise a base 210, a rotating plate 215, adapted to receive rotary motion from a drive shaft external to the axial piston pump 205, and for example a flange 220 for fixing to a motor equipped with said drive shaft.

The rotating plate 215 is housed in the base 210, is rotatably associated there-with with respect to an axis of rotation A, and for example it comprises a flat an-nular surface lying on an inclined plane with respect to the axis of rotation A.

The axial piston pump 205 comprises a head 225 fixed to the base 210, i.e. fixed without any residual degrees of freedom, to the base 210, in which a plurality of cylinders 230 is made, i.e. cylindrical holes, each adapted to contain respective pumping chambers 235 for containing the liquid and arranged with respective mutually parallel central axes.

Such central axes are also preferably parallel to the axis of rotation A.

The head 225 can be made in a unitary body, that can be obtained by processing a single body obtained from the solidification of a single cast or injection of material into a mold.

For example, the cylinders 230 are arranged radially along a common axis, in relation to which the central axes are parallel. Furthermore, they are placed at an equal distance from each other and at the same distance to the common axis. In other words, the cylinders 230, that is the central axes of the cylinders 230, are arranged at equidistant angles to each other along an imaginary circumference centered on the common axis. In the embodiment illustrated, the common axis of the cylinders 230 is the axis of rotation A.

Preferably the cylinders 230 are made as blind holes each equipped with an opening 240. In particular, the head can comprise a first face 245, which is transversal to the central axes of the cylinders, is proximal, preferably in contact, to the base 210, and is for example flat, and an opposite second face 250, which is transversal to the central axes of the cylinders and is distal from the base 210. The cylinders 230, i.e. the cylindrical holes, only cross the first face 245 making the respective opening 240 therein. In practice, the second face 250 is continuous, i.e. without interruptions. This means that with respect to axial piston pumps of the prior art it is not equipped with holes crossing the second face 250.

It is specified that the second face 250 and the first face 245 are connected by a tubular shaped side surface 255 of the head.

Each cylinder comprises a bottom portion opposite the respective opening 240 and that comprises a bottom wall 260 lying on a plane that is transversal, e.g. perpendicular, to the axis of the cylinder itself. For example, the bottom wall 260 is separated from the second face of the head by a non-null distance.

The valve 1 is housed at such bottom portion, which is shaped so that the valve 1 is arranged with the second opening 20 of the central duct 10 turned towards the opening of the cylinders.

The valve 1 is totally contained in the bottom portion.

In detail, such bottom portion comprises a first cylindrical surface 265, e.g. coaxial to the axis of the cylinder 230, which extends starting from the bottom surface 260 in the opening direction 240 of the cylinder 230, in which a portion of the valve body is inserted to measure, in particular the first portion 30. In practice, the first cylindrical surface 265 has a larger diameter with respect to the diameter of the cylindrical side surface 30a of the first portion 30 of the valve body 5.

The first retaining body 140 is completely contained in a volume that is partially defined by the first cylindrical surface 265 and the bottom wall 260.

The first cylindrical surface 265 has an extension in the direction of the axis of the cylinder 230 at least equal to the distance, measured in the same direction, between the first abutment surface 65 of the valve body 5 and a surface of the first retaining body 140 at the maximum distance from the first abutment surface 65.

The diameter of the first cylindrical surface 265 is always greater for its entire extension, in the direction of the central axis of the cylinder, with respect to the maximum dimensions of the first retaining body 140 in a perpendicular direction to the central axis of the cylinder. This means that the first cylindrical surface 265 is shaped so that between itself and the first retaining body 140 there is an annular gap of a non-null dimension along the entire extension of the first cylindrical surface itself.

In other words, the bottom portion does not comprise any surface in contact with the first retaining body 140 so as to keep it in contact with the valve body 5, i.e. the bottom portion does not comprise any shoulder for keeping the first retaining body 140 in position.

The sealing gasket 50 housed in the seat 45 obtained in the first portion 30 is therefore pressed between its own seat and the first cylindrical surface 265.

The bottom portion also comprises a second cylindrical surface 270 which extends in the direction of the opening 240 and which is directly connected to the first cylindrical surface 265 through a step 275 on which the first abutment sur-face of the valve 1 rests. The second cylindrical surface 270 has a diameter such as to house to measure the third portion 40, i.e. it has a diameter substantially equal to the diameter of the cylindrical side surface 40a of the third portion 40 of the valve body.

The cylinder comprises an inlet portion that extends from the bottom portion to the opening 240 and comprises a third cylindrical surface 280, which extends in the direction of the opening 240 and is directly connected to the second cylindrical surface 270 by means of a further step 285. The third cylindrical surface 280 has a larger diameter with respect to the second cylindrical surface 270.

The axial piston pump 205 then comprises a jacket 290 of a cylindrical tubular shape inserted into each cylinder 230 and equipped at an axial end thereof with an annular abutment surface 295, lying on a plane transversal to the central axis Z, e.g. perpendicular to the central axis Z, in contact with the second abutment surface of the valve 1.

The base and the jacket are shaped so that when the head 225 is fixed to the base 210 the jacket 290 pushes on the second abutment surface of the valve body 5 keeping the first abutment surface 65 of the valve body in contact with the step 275, substantially keeping the valve 1 in its seat.

In the embodiment illustrated, between an axial end of the jacket 290 opposite the one in contact with the valve 1 and the base, there is at least one sleeve adapted to house a sealing gasket 300 and that is compressed between the jacket and the base itself when the head is fixed to the base.

The jacket comprises an inner surface 305 which, at the annular abutment surface 295, has a diameter such as to house to measure, i.e. with reduced clearance, the second portion 35 of the valve body. This means that the minimum diameter of the inner surface of the jacket at the annular abutment surface 295 is larger than the diameter of the second cylindrical side surface 25a' of the second portion 35 of the valve body 5.

The sealing gasket 60 housed in the seat 55 obtained in the second portion 35 is therefore pressed between its own seat and said inner surface 305.

Between the inner surface 305 of the jacket and the second retaining body 145 there is always a gap of a non-null dimension.

Furthermore, a profile of the inner surface 305 defined by a sectional plane containing the central axis of the cylinder forms, in every portion thereof, an acute angle less than 30°, with an axis parallel to the central axis Z and that intersects the profile itself.

In other words, the jacket does not comprise any surface in contact with the second retaining body 145 so as to keep it in contact with the valve body 5 or such as to keep a spacer in contact with the second retaining body so that it compresses it against the valve body 5, i.e. the jacket does not comprise any shoulder for keeping the second retaining body in position.

In the embodiment illustrated, the inner surface 305 of the jacket comprises a first cylindrical portion that houses to measure the second portion of the valve body, a second truncated cone shaped portion directly contiguous with the first portion and a profile of which is defined by a sectional plane containing the central axis of the cylinder forms an acute angle less than 20° with an axis parallel to the central axis and that intersects the profile itself, and a third cylindrical portion directly contiguous with the second portion and having a smaller diameter with respect to the first portion.

Said jacket is preferably made of aluminum.

The axial piston pump 205 comprises a plurality of pistons 310 each adapted to slide in a respective cylinder 230, i.e. in a respective jacket 290 of the cylinder, activated by the rotating plate 215 for performing the pumping of the fluid pre-sent in a respective pumping chamber 235 which is at least partially defined by the cylinder, i.e. by the jacket of the cylinder, and by the valve 1.

In particular, the volume of the pumping chamber 235 is at least partially defined by the piston 310, by the cylinder, i.e. by the jacket of the cylinder, by the valve body, by the central duct 10 and by the first blocking body 95.

Following the rotation of the rotating plate 215, the pistons 310 are made to slide along the central axes of the respective cylinders 230 between a top dead center position, in which the volume of the pumping chamber 235 is minimum, and a bottom dead center position, in which the volume of the pumping chamber is maximum.

In the embodiment illustrated, each piston 310 has a first axial end that partially delimits the pumping chamber and an opposite second axial end that projects from the cylinder inside the base 210 and, through a respective elastic element 320, it is kept in contact with an annular guide 325 that rests on the flat annular surface of the rotating plate 215.

Each elastic element 320 has a first end connected to the base 210 and a second end connected to the piston 310, e.g. in proximity to the second end.

The axial piston pump 205 comprises a plurality of annular gaskets adapted to sealingly embrace a respective piston 310, e.g. some of such annular gaskets being housed in the base 210 and others in the head 20, in particular in the jacket of the cylinder, to prevent fluid communication between the pumping chambers 235 and the base 210.

Furthermore, the axial piston pump 205 can comprise a plurality of guide bushes 326, e.g. made in the base 210, each adapted to guide a respective piston 310 sliding along the central axis of the corresponding cylinder 230.

Such guide bushes 326 are in communication with the respective openings 240 of the cylinders made in the head 225.

The axial piston pump 205 can comprise a plurality of clamping screws, configured to fix the head to the base and that are inserted in the same number of through holes obtained in the head.

The pump comprises at least one suction duct 330 for cylinders, which comprises a hole that is obtained in the head 225 and is equipped with an inlet opening 335 made in the side surface 255 of the head.

Such suction duct then comprises a plurality of outlet openings 340, one per cylinder, which are obtained in the bottom portion of the cylinder, in particular at the second cylindrical surface 270.

Such hole in the suction duct has a longitudinal axis inclined by an angle less than 2° with respect to a perpendicular plane to the central axis of the cylinder. In the embodiment illustrated, the longitudinal axis of the suction duct, i.e. of the respective hole made in the head, is perpendicular to the axis of the cylinder.

The pump comprises a suction manifold connected to the suction duct 330.

The pump 1 comprises a plurality of delivery ducts 350, each of which comprises a hole that is obtained in the head 225 and is equipped with an outlet opening 355 made in the side surface 255 of the head. Each delivery duct 350 comprises a cap 360 that hermetically closes the respective outlet opening.

Each delivery duct 350 comprises an inlet opening 365 for each cylinder 230, which inlet opening is made in the bottom portion of the cylinder, in particular at the first cylindrical surface 265.

Each hole of a respective delivery duct has a longitudinal axis inclined by an angle less than 2° with respect to a perpendicular plane to the central axis of the cylinder. In the embodiment illustrated, the longitudinal axis of the hole in the delivery duct is perpendicular to the axis of the cylinder.

The pump also comprises a delivery manifold 370 adapted to join the delivery ducts 350, which is made in the head and comprises a hole that is obtained in the head 225 and is equipped with an outlet opening made in the side surface of the head.

Such hole in the suction manifold has a longitudinal axis inclined by an angle less than 2° with respect to a perpendicular plane to the central axis of the cylinder. In the embodiment illustrated, the longitudinal axis of the hole in the delivery manifold is perpendicular to the axis of the cylinder.

The head is preferably made of aluminum.

In particular, the head can be made of aluminum as the jacket of the cylinder and the valve are shaped and positioned so as to isolate the pumping chamber from the cylinder and therefore isolate the head from the pressure pulsations that create problems from a wear and fatigue point of view.

The operation of the valve and of the pump equipped with such valve is as follows.

When the pump performs a suction step, i.e. when the piston descends towards the bottom dead center point, a depression is created in the pumping chamber such for which the first elastic element 130 keeps the first blocking body in a closed position isolating the pumping chamber 235 from the delivery chamber and the fluid present in the suction duct overcomes the force of the second elastic element 135 bringing the second blocking body 110 into the open position. In this way the fluid from the delivery duct flows into the pumping chamber.

When the piston returns from the bottom dead center point to the top dead center point, the pump performs a pumping step, during which the increase in pressure in the pumping chamber enables the second elastic element 135 to bring the second blocking body into the closing step and the fluid under pressure through the central channel pushes on the first blocking body 95 overcoming the force of the first elastic element 130 so as to bring the first blocking body into the open position and send the flow to the delivery duct.

The invention thus conceived is susceptible to several modifications and variations, all falling within the scope of the inventive concept.

Moreover, all the details can be replaced by other technically equivalent elements.

In practice, the materials used, as well as the contingent shapes and sizes, can be whatever according to the requirements without for this reason departing from the scope of protection of the following claims.

What is claimed is:

1. An automatic double-acting valve (1) for high pressure pumps comprising:
   a valve body (5),
   a central duct (10), which passes through the valve body (5) and is equipped with a first opening (15) made in a first end (25A) of the valve body (5) and a second opening (20) made in an opposite second end (25B) of the valve body (5),
   a peripheral duct (75) made in the valve body (5), eccentric with respect to the central duct (10) and equipped with a first opening (80), made in a side surface of the valve body (5) comprised between the first end (25A) and the second end (25B), and a second opening (90) made in the second end (25B) of the valve body (5),
   a first blocking body (95) movable at least between a closed position, in which the blocking body (95) hermetically obstructs the first opening (15) of the central duct (10), and an open position, in which the blocking body (95) is spaced from the first opening (15) of the central duct (10) and allows the passage of flow through the first opening of the central duct,
   a first elastic element (130) configured to generate a force adapted to keep the first blocking body (95) in the closed position,
   a second blocking body (110) movable at least between a closed position, in which the second blocking body (110) hermetically obstructs the second opening (90) of the peripheral duct (75), and an open position, in which second blocking body (110) is spaced from the second opening (90) of the peripheral duct (75) and allows the passage of flow through the second opening of the peripheral duct, and
   a second elastic element (135) configured to generate a force adapted to keep the second blocking body (110) in the closed position,
   wherein the valve body comprises a first portion (30) equipped with the first opening (15) of the central duct (10), a second portion (35) equipped with the second opening (20) of the central duct (10), and a third portion (40) interposed between the first portion and the second portion and which is made of a material having a surface hardness lower than a material with which the first portion and second portion are made and wherein the third portion (40) is made of a material selected from the group consisting of: aluminum alloys and plastic.

2. The automatic double-acting valve (1) according to claim 1, wherein the first portion (30) and the second portion (35) are made of a material selected from the group consisting of: stainless steels and brass alloys.

3. The automatic double-acting valve (1) according to claim 1, wherein the first portion (30) and the second portion (35) are made of a metallic material selected from the group consisting of: stainless steels, brass alloys and aluminum alloys.

4. The automatic double-acting valve (1) according to claim 1, wherein the first portion (30) comprises a shank (30*b*) dimensioned in such a way as to be inserted by interference in a respective accommodation seat (40*b*) made in the third portion (40).

5. The automatic double-acting valve (1) according to claim 1, further comprising a retaining body (140,145) fixed to the valve body (5) and configured to hold at least one of the first elastic element (130) and the second elastic element (135) in position such that said at least one of the first elastic element and the second elastic element generates said force adapted to keep the respective blocking body in the closed position.

6. The automatic double-acting valve (1) according to claim 5, wherein the retaining body (140,145) is removably fixed to the valve body (5).

7. The automatic double-acting valve (1) according to claim 6, wherein the retaining body (140,145) is fixed to the valve body 5 through a snap coupling mechanism (150,175).

8. An axial piston pump (205) for pumping a liquid comprising:
   a base (210),
   a cylinder head (225) fixed to said base (210), a plurality of cylinders (230) having central axes parallel to each other and formed in the head (225), a plurality of pistons (310), each of which slide inside a respective cylinder of the plurality of cylinders for pumping the liquid, an inclined plate (215) configured to operate the sliding of said pistons (310) inside the respective cylinders (230), and an automatic double-acting valve (1), according to claim 1, for each cylinder (230).

* * * * *